United States Patent [19]
Hauff

[11] Patent Number: 4,993,724
[45] Date of Patent: Feb. 19, 1991

[54] WALL FEEDTHROUGH FITTING

[75] Inventor: Werner Hauff, Ballmertshofen, Fed. Rep. of Germany

[73] Assignee: Plastoform GmbH & Co. KG, Vlotho, Fed. Rep. of Germany

[21] Appl. No.: 395,729

[22] Filed: Aug. 18, 1989

[30] Foreign Application Priority Data

Aug. 24, 1988 [DE] Fed. Rep. of Germany ....... 3828693

[51] Int. Cl.$^5$ .......................... F16J 9/16; F16J 15/02
[52] U.S. Cl. .................................. 277/199; 277/105; 277/193; 277/221
[58] Field of Search ............... 277/192, 193, 199, 220, 277/221, 101, 105; 285/162, 196, 338, 346, 373; 138/113, 99, 110, 151, 158, 159

[56] References Cited

U.S. PATENT DOCUMENTS

| | | | |
|---|---|---|---|
| 795,444 | 7/1905 | Kales | 285/338 |
| 1,851,940 | 3/1932 | Williams | 138/89 |
| 3,528,668 | 9/1970 | Barton | 285/346 |
| 3,703,297 | 11/1972 | Gignac | 285/346 |
| 4,130,304 | 12/1978 | Hebard | 285/346 |
| 4,703,136 | 10/1987 | Hauff | 277/193 |

FOREIGN PATENT DOCUMENTS 3322809  6/1985  Fed. Rep. of Germany .

*Primary Examiner*—Allan N. Shoap
*Assistant Examiner*—Daniel G. DePumpo
*Attorney, Agent, or Firm*—Herbert Dubno; Andrew Wilford

[57] ABSTRACT

A feedthrough fitting for sealing around at least one conduit extending longitudinally through a cutout in wall at a transverse spacing from an inner surface of the cutout has an elastomeric one-piece seal having a pair of longitudinally oppositely directed faces, an outer surface corresponding generally to the inner surface, at least one longitudinally throughgoing passage extending between the faces and to the conduit, and at least one lateral split extending completely longitudinally between the faces and completely laterally from the passage to the outer surface. Thus the seal can be spread at the split to fit around the conduit. A respective end plate covers generally all of each of the faces and is formed of a plurality of separate sections together forming a hole corresponding to and longitudinally aligned with the passage. The sections of each pair are formed to a lateral side of the passage generally opposite the split with interfitting substantially part-circular edges and meet laterally at opposite edges to the opposite lateral side of the passage. Fasteners engaging longitudinally through the two plates and seal longitudinally compress the seal and force the outer surface against the inner surface. Thus the fitting can be opened at the split with the plates and fasteners in place by elastic deformation of the seal at the interfitting surfaces and pivoting of the sections of the plates of each plurality of plates relative to each other at the part-circular edges.

7 Claims, 7 Drawing Sheets

WALL FEEDTHROUGH FITTING

FIELD OF THE INVENTION

The present invention relates to a wall feedthrough fitting. More particularly this invention concerns such a fitting used to seal around a conduit that traverses a wall.

BACKGROUND OF THE INVENTION

When conduits, whether they are constituted as pipes, hoses, electrical wires, or the like, pass through a wall it is normally necessary to seal tightly and hermetically around them. In particular in firecode construction it is necessary for the joint around the conduits to be of the same rating as the wall. Accordingly it is known to use wall feedthrough fittings comprising basically a sleeve that is fitted through the wall and through which the conduits pass longitudinally and a group of blocks that fit snugly between the conduits and the sleeve.

German Pat. No. 3,322,809 (filed June 24, 1983 and issued June 27, 1895 to W. Hauff) shows such a wall feedthrough fitting having an inner ring permanently mounted in a passage in the wall and formed with an inwardly tapering inner portion and an internally threaded outer portion. The seal is formed by a plurality of separate pie-shaped blocks that meet at interfaces defining passages for the conduits longitudinally traversing the wall.

In order to assemble such a fitting around conduits already passing through the wall, the individual blocks are fitted together between the conduits and the inner wall-mounted ring. Then an outer ring that engages over the outer faces of the blocks at the outer peripheries thereof is threaded into the outer portion of the inner ring This outer ring is then screwed longitudinally into the inner ring to force the wall blocks inward, compressing them laterally against the inner surface of the inner ring and the outer surfaces of the conduits.

Unfortunately since the outer ring only engages over the outer edges of the seal blocks, the seal formed thereby tends to bulge longitudinally outward, opening gaps on the outer face. of the seal at the interfaces between adjacent seal blocks. Another problem with this system is that the entire seal must be completely disassembled prior to use so that not only is there a good likelihood of losing parts, but the subsequent reassembly becomes a laborious and time-consuming task.

OBJECTS OF THE INVENTION

It is therefore an object of the present invention to provide an improved wall feedthrough fitting.

Another object is the provision of such an improved wall feedthrough fitting which overcomes the above-given disadvantages, that is which is easy to fit to a conduit, which provides a very tight seal, which does not need to be disassembled to be installed, and which does not require that a part of it be mounted in the wall during its manufacture.

SUMMARY OF THE INVENTION

A feedthrough fitting for sealing around at least one conduit extending longitudinally through a cutout in wall at a transverse spacing from an inner surface of the cutout according to this invention has an elastomeric one-piece seal having a pair of longitudinally oppositely directed faces, an outer surface corresponding generally to the inner surface, at least one longitudinally throughgoing passage extending between the faces and to the conduit, and at least one lateral split extending completely longitudinally between the faces and completely laterally from the passage to the outer surface. Thus the seal can be spread at the split to fit around the conduit. A respective end plate covers generally all of each of the faces and is formed of a plurality of separate sections together forming a hole corresponding to and longitudinally aligned with the passage. The sections of each pair are formed to a lateral side of the passage generally opposite the split with interfitting substantially part-circular edges and meet laterally at opposite edges to the opposite lateral side of the passage. Fasteners engaging longitudinally through the two plates and seal longitudinally compress the seal and force the outer surface against the inner surface. Thus the fitting can be opened at the split with the plates and fasteners in place by elastic deformation of the seal at the interfitting surfaces and pivoting of the sections of the plates of each plurality of plates relative to each other at the part-circular edges.

With the system of this invention, therefore, the wall can be formed with a simple cylindrical hole and the conduit or conduits can be fitted longitudinally through this hole. Then the fitting is assembled in situ around these conduits and is slid along them into the hole. Then the fasteners are tightened to compress the seal longitudinally, forcing its outer periphery into tight engagement with the inner surface of the cutout in the wall and also forcing the inner surface of the passage into tight engagement with the conduit or conduits. The plates cover substantially all of the faces of the seal so that no extrusion of the seal in unwanted directions occurs.

According to a further feature of this invention the splits in the seal have longitudinally spaced inner and outer ends that are transversely offset from each other. The inner end of each split opens on one face of the seal to one lateral side of the respective opposite split and the outer end of each split opens on the opposite face of the seal to the opposite lateral side of the respective opposite split. Thus the split in the seal is covered by the plates at both ends, ensuring that it will not open up as the seal is compressed. In fact according to the invention the splits can meet at interfitting nonplanar edge faces.

In order to maintain the holes in the plates and the passage of the seal aligned, the seal is formed on its faces with annular ridges surrounding the passage and engaging longitudinally through the hole in the respective plate.

In accordance with a further feature of this invention the plates and seals are formed with longitudinally aligned throughgoing bores through which the fasteners extend. The fasteners are bolts having heads bearing longitudinally on one of the plates and nuts bearing on the other plate.

It is also within the scope of this invention for the seal to be formed with a plurality of such passages and with respective splits in which case the plate includes a respective such section for each passage. Some splits will also run between adjacent such passages.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3 is a transverse section taken along line III—III of FIG. 1;

FIG. 4 is a side view taken in the direction of arrow IV of FIG. 1;

SPECIFIC DESCRIPTION

Figure 1:
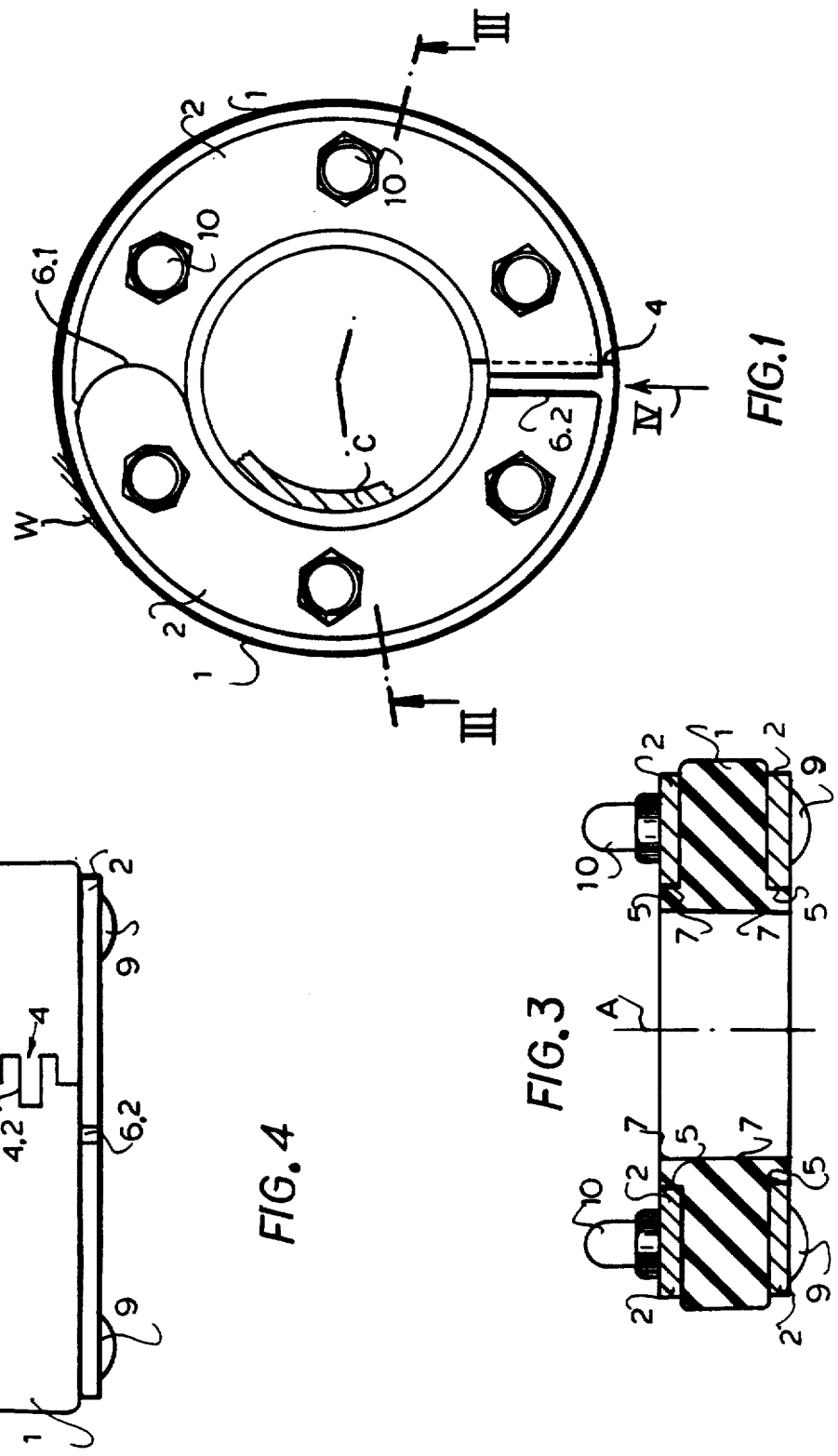
FIG. 1 is a longitudinal end view of a fitting according to this invention, shown in the closed or use position.

As seen in FIGS. 1-5 the fitting according to this invention basically comprises an annular one-piece elastomeric seal ring 1 sandwiched between a pair of identical end plates 2 that each cover substantially all of the respective end face of the ring 1. The ring 1 is formed centrally with a longitudinal throughgoing passage 3 centered on a longitudinal axis A and the plates 2 are correspondingly formed with circular central holes 5 that are aligned with but slightly larger than the passage 3. Each longitudinal end face of the ring 1 is formed around the passage 3 with a respective annular ridge 7 that fits within the respective hole 5, keeping the parts 1 and 2 centered on each other.

The ring 1 is formed with a radially or laterally throughgoing split 4 extending at a longitudinally inner end from the surface of the passage 3 to a longitudinally outer end at the cylindrical outer periphery of the ring 1. In addition the ring 1 is formed with six angularly equispaced longitudinally throughgoing holes 8 aligned longitudinally with identical holes in the plates 2. Carriage bolts 9 have heads bearing on one of the plates 2 and extend longitudinally through the holes 8 to where they have nuts 10 bearing longitudinally on the other plate 2.

Figure 2:
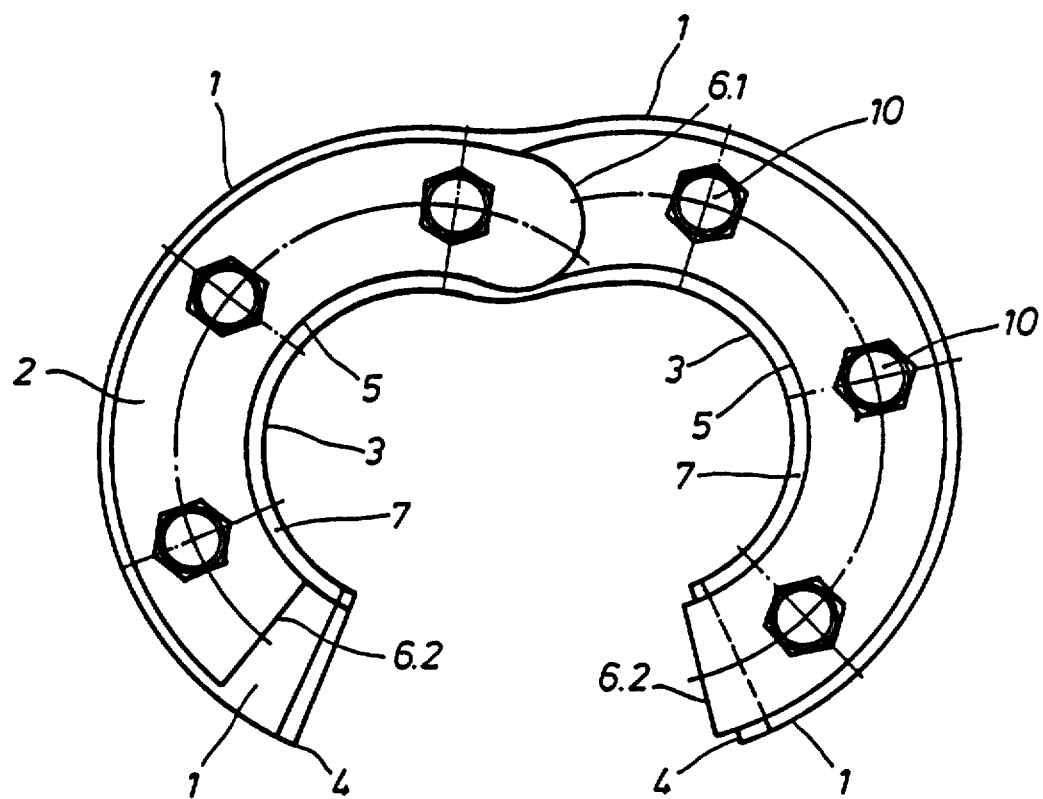
FIG. 2 is a view like FIG. 1 but showing the fitting in the open position.
Figure 5:
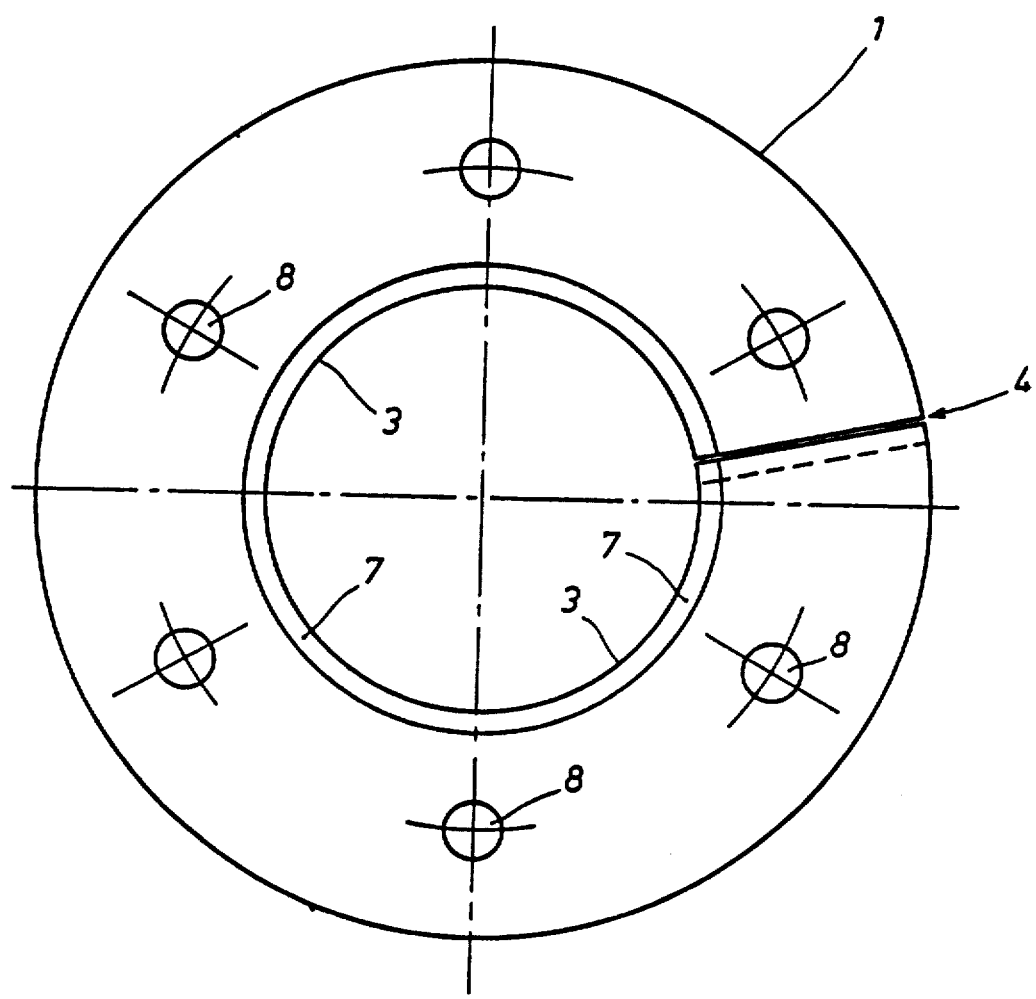
FIG. 5 is an end view of the seal of the fitting of FIGS. 1-4.

Each of the plates 2 as seen in FIGS 1 and 2 is actually formed of a pair of arcuate sections that meet roughly at the split 4 at end edges 6.2 and that interfit opposite the split 4 at complementary circular end surfaces 6.1.

As is seen by a comparison of FIGS. 1 and 2 it is therefore possible to open or spread the fitting by pulling it apart at the split 4. This opens up the split 4 and deforms the ring 1 elastically at the surfaces 6.1 which roll off against each other when the fitting is thus opened up. This makes it possible to fit the passage 3 around a pipe or conduit C (shown in part in FIG. 1) and then to close out around this conduit C.

The ends 6.2 of the plate sections forming the plate 2 are offset somewhat from the split 4 so that when subsequently closed leakage at this split 4 is unlikely.

Once thus fitted around the conduit C, the entire fitting can be pushed into a cylindrical hole in a wall shown partly at W in FIG. 1. Then the bolts 9 are tightened, it being noted that the heads of these bolts have square-section shanks that fit into complementary holes in the respective plate 2 to prevent these bolts 9 from turning. Tightening of the nuts 10 therefore axially compresses the ring 1 forcing its inner surface or periphery against the conduit C and its outer surface or periphery against the wall W.

Figure 6:
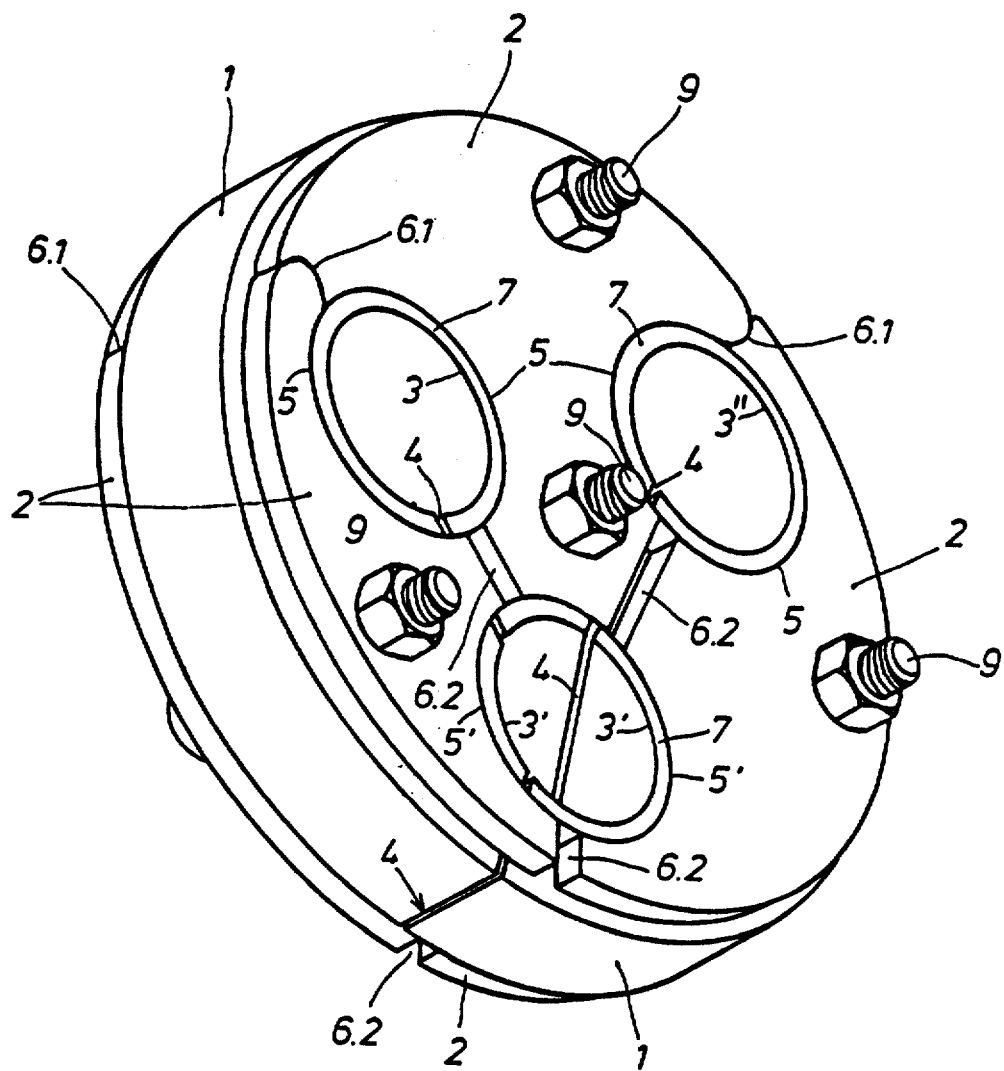
FIG. 6 is a perspective view of another seal according to this invention.
Figure 7:
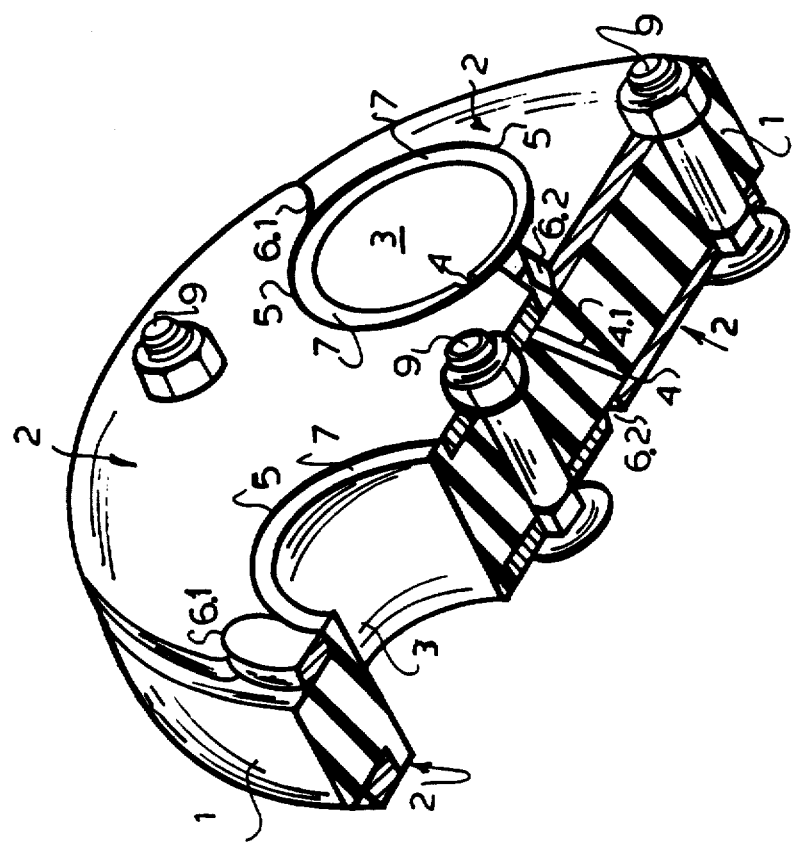
FIG. 7 is a view like FIG. 6 but showing the seal of FIG. 6 is longitudinal section.
Figure 8:
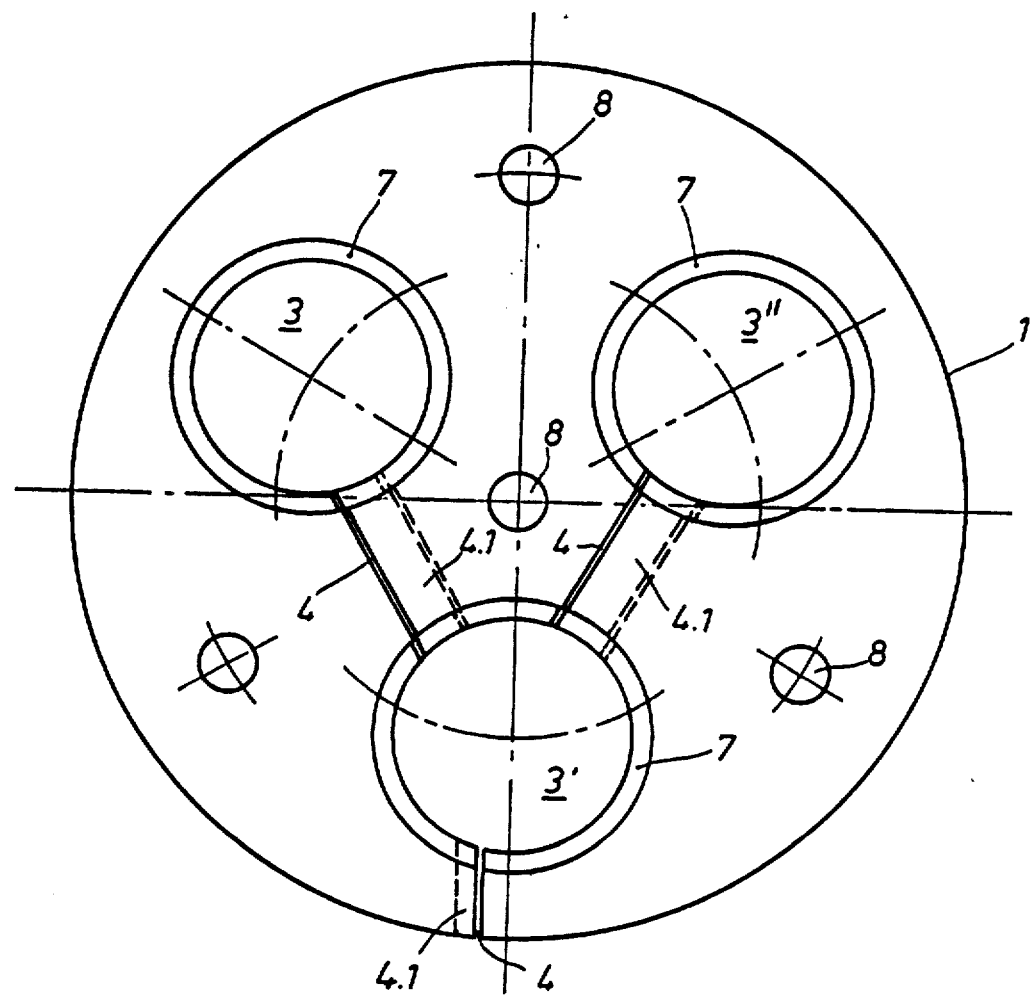
FIG. 8 is a longitudinal end view of the seal of the fitting of FIGS. 6 and 7.

The system of FIGS. 6-8, where reference numerals for structure functionally identical to that of FIGS. 1-5 bears the same reference numerals, is formed, however, with three such passages 3, 3' and 3". Each of the plates 2 is also formed of three sections, two of which can roll off against one of the other sections at arcuate edge surfaces 6.1. Here splits 6.2 are provided not only from the holes 3 to the outer periphery of the ring 1 but also between each of the holes 3 and 3" and the hole 3' and the seal 1 is formed with corresponding slits 4.

In this arrangement each of the splits 4 is angled as shown in FIG. 7 at 4.1 so that the inner longitudinal end of each split 4 lies to one lateral side of the respective split 6.2 and the other end of each split 4 lies to the other end of the split 6.2 of the other respective plate.

The arrangement of FIGS. 6-8 is used like that of FIGS. 1-5, that is the conduits are fitted through the holes 3, 3' and 3" by opening up the fitting and elastically deforming the seal 1, during which action the surfaces 6.1 roll off against each other.

Figure 9A:
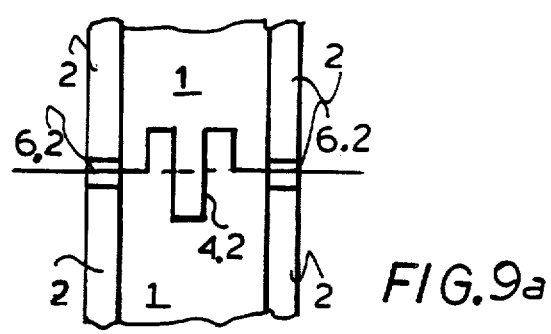
FIGS. 9a-9d are detail views illustrating variants of the system of this invention.
Figure 9B:
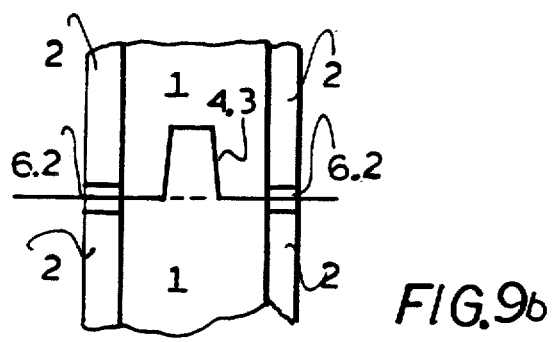
Figure 9C:
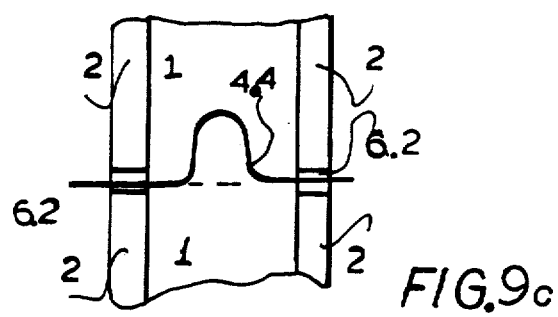
Figure 9D:
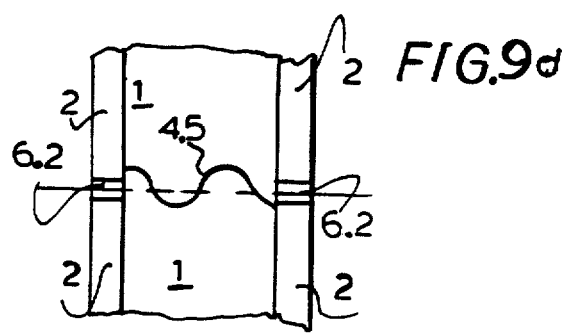

FIG. 9a shows how a split 4.2 can be shaped as an interfitting multiple tongue and groove for best sealing. FIG. 9b shows a single tongue and groove split 4.3 of generally square section while FIG. 9c shows a split 4.4 of rounded shape. In FIG. 9d the split 4.5 is sinusoidal or corrugated in shape.

Thus with the system of this invention it is not necessary to disassemble the fitting to install it. Instead all of its parts remain together, eliminating the possibility of losing them and speeding installation.

I claim:

1. A feedthrough fitting for sealing around at least one conduit extending longitudinally through a cutout in a wall at a transverse spacing from an inner surface of the cutout, the fitting comprising:
    an elastomeric and annular one-piece seal having
        a pair of longitudinally oppositely directed faces,
        an outer surface corresponding generally to the inner surface,
        at least one longitudinally throughgoing passage extending between the faces and to the conduit, and
        at least one lateral split extending completely longitudinally between the faces and completely laterally from the passage to the outer surface, whereby the seal can be spread at the split to fit around the conduit with elastic deformation of the seal to a lateral side generally opposite the split;
    a respective end plate covering generally all of each of the faces and formed of a plurality of separate section together forming a hole corresponding to and longitudinally aligned with the passage, the sections of each plate being formed to the lateral side of the passage generally opposite the split with interfitting substantially part-circular edges that interfit angularly without longitudinally overlapping, the sections meeting laterally at opposite edges to the opposite lateral side of the passage that angularly confront each other without longitudinally overlapping; and means including fasteners engaging longitudinally through the two plates and seal for longitudinally compressing the seal and forcing the outer surface against the inner surface, whereby the fitting can be opened at the split with the plates and fasteners in place by elastic deformation of the seal at the interfitting surfaces and pivoting of the sections of the plates of each plurality of plates relative to each other at the part-circular edges.

2. The wall feedthrough fitting defined in claim 1 wherein the splits in the seal have longitudinally spaced inner and outer ends that are transversely offset from each other, the inner end of each split opening on one face of the seal to one lateral side of the respective opposite split and the outer end of each split opening on the opposite face of the seal to the opposite lateral side of the respective opposite split.

3. The wall feedthrough fitting defined in claim 1 wherein the splits in the seal meet at interfitting nonplanar edge faces.

4. The wall feedthrough fitting defined in claim 1 wherein the seal is formed on its faces with annular ridges surrounding the passage and engaging longitudinally through the hole in the respective plate.

5. The wall feedthrough fitting defined in claim 1 wherein the plates and seals are formed with longitudinally aligned throughgoing bores through which the fasteners extend.

6. The wall feedthrough fitting defined in claim 5 wherein the fasteners are bolts having heads bearing longitudinally on one of the plates and nuts bearing on the other plate.

7. The wall feedthrough fitting defined in claim 1 wherein the seal is formed with a plurality of such passages and with respective splits, the plate including a respective such section for each passage.

* * * * *